(12) United States Patent
Lewis et al.

(10) Patent No.: US 9,150,436 B2
(45) Date of Patent: Oct. 6, 2015

(54) MANGANESE OXIDE-BASED AND METALLOMANGANESE OXIDE-BASED ION-EXCHANGERS FOR REMOVING MERCURY (+2) IONS FROM LIQUID STREAMS

(71) Applicant: UOP LLC, Des Plaines, IL (US)

(72) Inventors: Gregory J. Lewis, Santa Cruz, CA (US); Paulina Jakubczak, Elk Grove Village, IL (US); Julio C. Marte, Carol Stream, IL (US)

(73) Assignee: UOP LLC, Des Plaines, IL (US)

( * ) Notice: Subject to any disclaimer, the term of this patent is extended or adjusted under 35 U.S.C. 154(b) by 225 days.

(21) Appl. No.: 13/924,971

(22) Filed: Jun. 24, 2013

(65) Prior Publication Data

US 2014/0374358 A1    Dec. 25, 2014

(51) Int. Cl.
| | |
|---|---|
| *C02F 1/42* | (2006.01) |
| *B01J 20/02* | (2006.01) |
| *C02F 1/28* | (2006.01) |
| C02F 101/20 | (2006.01) |
| C02F 103/10 | (2006.01) |
| B01J 39/10 | (2006.01) |

(52) U.S. Cl.
CPC . *C02F 1/42* (2013.01); *B01J 20/02* (2013.01); *C02F 1/281* (2013.01); *B01J 39/10* (2013.01); C02F 2001/425 (2013.01); C02F 2101/20 (2013.01); C02F 2103/10 (2013.01)

(58) Field of Classification Search
CPC .. C02F 1/42; C02F 2001/425; C02F 2101/20; C02F 1/281; C02F 2103/10; B01J 20/20; B01J 39/02; B01J 39/085; B01J 39/10
See application file for complete search history.

(56) References Cited

U.S. PATENT DOCUMENTS

| | | | |
|---|---|---|---|
| 5,637,545 A | 6/1997 | Lewis | |
| 6,190,562 B1 | 2/2001 | Kulprathipanja et al. | |
| 7,419,637 B2 | 9/2008 | Boren et al. | |
| 7,488,464 B2 | 2/2009 | Hammel et al. | |
| 7,655,148 B2 | 2/2010 | Chen et al. | |
| 2010/0005963 A1 | 1/2010 | Snape et al. | |
| 2010/0059428 A1 | 3/2010 | Boren et al. | |
| 2012/0024799 A1 | 2/2012 | Chen et al. | |
| 2012/0103907 A1 | 5/2012 | MacKinnon et al. | |
| 2013/0200001 A1* | 8/2013 | Kim et al. | 210/685 |

FOREIGN PATENT DOCUMENTS

| | | |
|---|---|---|
| JP | 2008018312 A | 1/2008 |
| JP | 2009254920 A | 11/2009 |

OTHER PUBLICATIONS

Golden, "Ion Exchange, Thermal Transformations, and Oxidizing Properties of Birnessite", Clays and Clay Minerals, vol. 34, No. 5, 511-520, 1986.
Lisha, "Manganese dioxide nanowhiskers: A potential adsorbent for the removal of Hg(II) from water", Chemical Engineering Journal 160 (2010) 432-439.
Liu, "Adsorption of Heavy Metal Ions on Two Types of Manganese Oxides Analyzed by AAS and AFS", Spectroscopy and Spectral Analysis, vol. 32, No. 10, pp. 2842-2846, Oct. 2012.
Mishra, "Inorganic particulates in removal of heavy metal toxic ions IX. Rapid and efficient removal of Hg(II) by hydrous manganese and tin oxides", Journal of Colloid and Interface Science 279 (2004) 61-67.
Pakarinen, "Nanoporous manganese oxides as environmental protective materials—Effect of Ca and Mg on metals sorption", Journal of Hazardous Materials 180 (2010) 234-240.
Search Report dated Oct. 17, 2014 for corresponding PCT Appl. No. PCT/US2014/042509.

* cited by examiner

*Primary Examiner* — Matthew O Savage

(57) ABSTRACT

A process for removing $Hg^{2+}$ ions from a liquid stream is disclosed. The process involves contacting the liquid stream with specified ion-exchangers based on manganese oxides and metallomanganese oxides of the form $$A^{n+}{}_w M^{3+}{}_x Mn_{1-x} O_2$$

where A can be cations such as $Na^+$ or $Mg^{2+}$, $M^{3+}$ can be metals such as $Fe^{3+}$ or $Co^{3+}$, and the TIC, the theoretical ion exchange capacity per framework metal atom, varies from 0.08 to 0.25. These ion-exchangers are particularly effective in removing $Hg^{2+}$ ions from aqueous streams even in the presence of $Mg^{2+}$ and $Ca^{2+}$ ions.

16 Claims, No Drawings

MANGANESE OXIDE-BASED AND METALLOMANGANESE OXIDE-BASED ION-EXCHANGERS FOR REMOVING MERCURY (+2) IONS FROM LIQUID STREAMS

BACKGROUND OF THE INVENTION

The present invention relates to a process for removing contaminant mercury ions from liquid streams, especially aqueous streams, using manganese oxide-based and metallomanganese oxide-based ion-exchangers.

Industrial processes such as mining and natural gas exploration produce waste waters that contain $Hg^{2+}$ that are released into the environment. Legislation is restricting these releases of toxic Hg and improved methods are needed for removal of mercury before these waters can be returned to the environment. Ion-exchange is one method by which $Hg^{2+}$ may be removed from a liquid stream. Many of these $Hg^{2+}$ contaminated streams will contain significant amounts of metals derived from minerals, including $Ca^{2+}$ and $Mg^{2+}$, which are quite common and may compete with $Hg^{2+}$ for ion-exchange sites on an adsorbent. In these situations, $Hg^{2+}$ selectivity is important for an adsorbent to function and so that its capacity for $Hg^{2+}$ removal is not severely diminished by competing cations.

Manganese-based oxides have been utilized as oxidants, ion-exchangers and supports for the remediation of both liquid and gaseous streams containing Hg. In the role of support, sulfur and halogen loaded hydrous manganese oxides are used to remove both metallic Hg and $Hg^{2+}$ from aqueous solutions (See US 20120103907 A1). This application discusses the use of delta and beta manganese oxides, and pyrolusite, which are derivatized by ammonium and alkali bromides, iodides and sulfides via a redox reaction to accomplish the loading. $Hg^{2+}$ removal is accomplished by the supported species. Manganese oxides can play the role of oxidant in multicomponent adsorbents, such as is disclosed in JP 2010015858A. This adsorbent consists of 20-40% manganese dioxide, 40-65% $Fe_2O_3$, 10-20% silica, alumina, or titania, and 0.5-5% Ag. This adsorbent removes Hg, As and S from hydrocarbon streams via oxidation and adsorption of the oxidized products. Similarly, U.S. Pat. No. 7,655,148 B2 and US 20120024799 A1 disclose two component adsorbents that consist of oxidant and adsorbent components, the oxidants consisting of manganese dioxide or iron oxide and the adsorbents consisting of zirconium oxide, titanium oxide, and iron oxide. The manganese oxide utilized was the potassium manganese oxide synthesized from $KMnO_4$ and $MnSO_4$, which has the hollandite structure, a rectangular one-dimensional tunnel structure with two $MnO_6$ octahedra lining each side of the tunnel. This structure is often designated as a 2×2 tunnel structure. The adsorbent composites were demonstrated on arsenite remediation from aqueous solutions, in which arsenite ($As^{3+}$) was oxidized to arsenate ($As^{5+}$), with the anionic arsenate being picked up by the titania, zirconia or iron oxide adsorbent. One problem with this mode of operation was the loss of the manganese oxide adsorbent as soluble $Mn^{2+}$ was generated by the oxidation process. Attempts to stabilize the potassium manganese oxides from Mn loss were made doping with $Fe^{3+}$. These materials were also shown to remove $Pb^{2+}$ from water; the suggested mechanism was ion-exchange with protons on the manganese oxide-iron oxide composite. It was suggested that these materials may also be useful for the removal of cationic and metallic Hg from aqueous solutions. An apparatus and method of metals removal from both gaseous and aqueous streams is disclosed in US 20100059428 A1, which focuses on manganese dioxide based adsorbents. The apparatus is versatile and designed to control a variety of synthesis parameters. No specific manganese oxides are claimed beyond those with a Mn oxidation state between than 3 and 4. Examples included the oxidation of $Mn^{2+}$ salts in KOH with $K_2S_2O_8$, which likely yield potassium-containing layered birnessites via the topotactic oxidation of $Mn(OH)_2$. The target pollutants studied with this system were Pb, Fe, Cr and Cu, both in metallic and cation forms, and arsenate and arsenite anions. Two related patents describe more of the workings of this apparatus designed to make manganese oxide-based adsorbents and their use, see U.S. Pat. No. 7,488,464 B2 and U.S. Pat. No. 7,419,637 B2. The removal of radioactive $Hg^{2+}$ from aqueous solution by $\gamma\text{-}Mn_2O_3$, which has a defect spinel structure, has been disclosed (See JOURNAL OF COLLOID AND INTERFACE SCIENCE, 279 (2004), 61-67). The basis for the $Hg^{2+}$ removal was a pH dependent surface charge and up to 96% of the $Hg^{2+}$ was removed from solution, depending on conditions. Likewise, so-called manganese dioxide nanowhiskers adsorb $Hg^{2+}$ via a similar mechanism, as revealed in CHEMICAL ENGINEERING JOURNAL, 160, (2010), 432-439. This nanowhisker material is produced via the reduction of $KMnO_4$ with ethanol. The material is said to have the layered birnessite structure, possess a $Mn^{4+}$ oxidation state, but there is no $K^+$ incorporated between the layers as in traditional birnessites. The mechanism of $Hg^{2+}$ uptake is believed to be physisorption, which is pH dependent and operates best in the pH range of 6-9. In other work, OMS-2, which is the K-containing 2×2 tunnel structure (hollandite structure) discussed above, and OL-1 (a birnessite layer) octahedral molecular sieves were looked at for their ability to pick up $Pb^{2+}$, $Cu^{2+}$, $Ni^{2+}$ and $Hg^{2+}$ from solution via ion-exchange (See Guang Pu Xue Yu Guang Pu Fen Xi (2012), 32 (10), 2842-2846). Both the OL-1 and OMS-2 used in the study are prepared in the $K^+$ form. It was generally found that the tunnel structure of OMS-2 was more effective at removing metals than OL-1, removing 94% of $Hg^{2+}$ from aqueous solution. Another study looked at the capability of OMS-1 ($Mg^{2+}$ form, 3×3 todorokite structure, derived from buserite layers) and OMS-2 ($K^+$ form, 2×2 tunnel hollandite structure, derived from potassium permanganate oxidation of a $Mn^{2+}$-containing solution) to remove $Cu^{2+}$, $Ni^{2+}$ and $Cd^{2+}$ in the presence of $Ca^{2+}$ and $Mg^{2+}$ (See JOURNAL OF HAZARDOUS MATERIALS, (2010), 180 (1-3), 234-240). Both materials showed good selectivity for the uptake of $Cu^{2+}$, the adsorption of which was not bothered by the presence of $Ca^{2+}$ and $Mg^{2+}$. OMS-1 was found to be somewhat but considerably less effective for $Cd^{2+}$ removal and OMS-2 was less effective for $Ni^{2+}$ uptake and not effective for $Cd^{2+}$ uptake.

In U.S. Pat. No. 5,637,545, which is incorporated by reference, it is shown that manganese oxides and metal-substituted manganese oxides with the 2×2 tunnel hollandite structure can be prepared via the reduction of permanganates with excess acetic acid under mild conditions. The hollandite structure was formed for these materials in the presence of $K^+$ or $NH_4^+$ cations, such as $K_{1.12}Mn_8O_{16}$ in Example 1 of that patent. This reduction with excess acetic acid was useful in that it only reduced the pure manganese oxides to a certain extent, to an oxidation state just below $Mn^{4+}$, where the ion-exchange capacity was in the range of 1-1.2 cations ($K^+$ or $NH_4^+$)/8 Mn or $A_{0.125\text{-}0.15}Mn$, where $A^+$ is the cation that can be exchanged. In the metal substituted manganese oxides forming the hollandite structure, the exchanging ion content was found to vary from 0.7-1.2 $A^+$/8 Mn for an ion-exchange capacity of $A_{0.09\text{-}0.15}Mn$, or $A^+/Mn=0.09\text{-}0.15$, when $A^+$ is singly charged.

In contrast to the $Hg^{2+}$ remediation efforts previously disclosed, the present invention discloses a process for removing $Hg^{2+}$ from aqueous solution via ion-exchange using unique manganese oxide-based and metallomanganese oxide-based ion-exchangers that are selective for removing $Hg^{2+}$ ions from liquid streams. The properties of an ion-exchanger that affect its efficacy are a stable ion-exchange capacity, the identity of and the ease with which the resident ion is displaced from the ion-exchanger, and an affinity of the ion-exchanger for the ion to be removed from solution that is greater than that of other competing metal cations that may be present. The present invention has found that ion-exchangers based on manganese oxides and metal substituted manganese oxides that contain the $A^{n+}$ cations $H^+$, $Na^+$, $NH_4^+$, $Ca^{2+}$, $Mg^{2+}$ and $Li^+$ in which there are 0.08 to 0.25 exchange equivalents per framework metal (Mn+M) will selectively remove $Hg^{2+}$ ions from solutions that also contain $Mg^{2+}$ and $Ca^{2+}$ cations, regardless of the crystal structure, or lack thereof, of the manganese oxide-based or metallomanganese oxide-based ion-exchanger. The ion-exchangers were more effective in these cation forms than $K^+$-containing ion-exchangers prepared under similar conditions.

SUMMARY OF THE INVENTION

The present invention relates to a process for purifying $Hg^{2+}$-containing aqueous waste streams using manganese oxide-based and metallomanganese oxide-based ion-exchangers. One specific embodiment is a process for removing the $Hg^{2+}$ contaminant from a liquid stream comprising contacting the stream with an ion-exchanger for a time sufficient to adsorb the metal contaminant onto the ion-exchanger, the ion-exchanger characterized in that it has the composition on an anhydrous basis given by

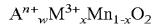

where "A" is at least one exchangeable cation from the set of $H^+$, $Na^+$, $NH_4^+$, $Li^+$, $Mg^{2+}$ and $Ca^{2+}$, "M" is at least one framework metal of +3 valence from the set Al, Fe, Cr, Co, and Ga, "w" is the mole ratio of "A" to the framework metals (M+Mn) and varies from 0.04 to 0.25, "n" is the weighted average valence of "A" and varies from 1 to 2, n*w is the framework charge balanced by the "A" cations and varies from 0.08 to 0.25, "x" is the mole fraction of "M" that substitutes for Mn and varies from 0 to 0.20, and this composition does not have to conform to any particular crystal structure and can be amorphous.

The process by which these manganese oxide-based and metallomanganese oxide-based ion-exchangers may be used to remove $Hg^{2+}$ contaminants from a liquid stream may be a batch process or a continuous process. This and other objects and embodiments of the invention will become more apparent after a more detailed description of the invention.

DETAILED DESCRIPTION OF THE INVENTION

One embodiment of the present invention is the removal of $Hg^{2+}$ from aqueous streams via ion-exchange using the manganese oxide-based and metallomanganese oxide-based ion exchangers. The as-synthesized manganese oxide and metallomanganese oxide-based ion-exchangers may be described by the general formulation on an anhydrous basis

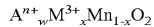

where "A" is at least one exchangeable cation selected from the group of $H^+$, $Na^+$, $Li^+$, $NH_4^+$, $Mg^{2+}$ and $Ca^{2+}$, "n" is the weighted average valence of the "A" cations and ranges from 1 to 2, "w" is the mole ratio of "A" to framework metals (Mn+M) and varies from 0.04 to 0.25, n*w is the framework charge balanced by the "A" cations and varies from 0.08 to 0.25, "M" is at least one metal of +3 valence selected from the group Al, Fe, Co, Cr, and Ga, "x" is the mole fraction of M that substitutes for Mn and varies from 0 to 0.20 and this composition does not have to conform to any particular crystal structure and can be amorphous.

When "A" is only one cation, then the weighted average valence is the valence of that one cation, i.e. +1 or +2. However, when more than one "A" cation is present, the total amount of:

$$A_w^{n+} = A_{w1}^{(n1)+} + A_{w2}^{(n2)+} + A_{w3}^{(n3)+} + \ldots$$

and the weighted average valence n is given by the equation:

$$n = \frac{w_1 \cdot n_1 + w_2 \cdot n_2 + w_3 \cdot n_3 + \ldots}{w_1 + w_2 + w_3 \ldots}$$

The instant manganese oxide and metallomanganese oxide-based compositions have a framework structure based on $MnO_{6/3}$ and $[M^{3+}O_{6/3}]^-$ octahedral units. The process for preparing the manganese oxide and metallomanganese oxide-based ion exchangers utilized in the present invention comprises forming a reaction mixture containing reactive sources of A, Mn, optionally M and optionally T, in which T is an oxidizing agent or reducing agent for adjusting the Mn oxidation state, heating the reaction mixture at a temperature of about 25° C. to about 175° C. for a time sufficient to form the ion-exchanger, the reaction mixture having a composition expressed in terms of mole ratios of the oxides of:

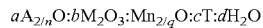

where "n" is the weighted average valence of "A", "a" has a value of about 0.2 to about 20, "b" ranges from 0 to about 0.25, "q" is the oxidation state of Mn and ranges from +2 to +7, "c" has a value of about 0 to about 20 and "d" has a value of about 5 to about 200.

The manganese source can be an appropriate manganese salt or manganese oxide. Examples of manganese sources are $NaMnO_4*H_2O$, $Mg(MnO_4)_2$, $Ba(MnO_4)$, $NH_4MnO_4$, Na-birnessite, Na-buserite, $NH_4$-bimessite, $Mn(NO_3)_2*6H_2O$, $Mn(OAc)_2*4H_2O$, and $MnSO_4*H_2O$. The source of "A" which includes $H^+$, $Na^+$, $Li^+$, $NH_4^+$ $Mg^{2+}$, and $Ca^{2+}$, can be introduced as part of the manganese source, M source, the T source, or as a separate component. When added as a separate component, sources of "A" can include the nitrate, acetate, sulfate, carbonate and the hydroxide salts. Specific examples include lithium acetate, lithium nitrate, lithium sulfate, sodium nitrate, sodium hydroxide, sodium acetate, sodium sulfate, sodium carbonate, ammonium nitrate, ammonium sulfate, ammonium hydroxide, ammonium acetate, magnesium nitrate, magnesium acetate, magnesium sulfate, calcium acetate, calcium nitrate, and calcium sulfate. When "A" is $H^+$, examples of sources include mineral acids such as $H_2SO_4$ and $HNO_3$. Likewise, examples of sources of the "M" metals include $Al(NO_3)_3*9H_2O$, $Al_2(SO_4)_3*18H_2O$ $Fe(NO_3)_3*9H_2O$, ferric sulfate, $Cr(NO)_3*9H_2O$, $Co(OAc)_2*4H_2O$, cobalt nitrate, cobalt sulfate, gallium nitrate and gallium sulfate.

Another component that may be added to the reaction mixture is a compound that can adjust the oxidation state of Mn, i.e., an oxidizing or reducing agent (T). Illustrative examples of these compounds are $CH_3COOH$, $NaHCO_2$, $LiHCO_2$, $(NH_4)_2S_2O_8$, $NH_4OAc$, $NaOAc$, and $H_2O_2$. In certain cases sources of M or Mn can also function as reducing agents, such as $Mn^{2+}$ and $Co^{2+}$. For instance, $Co^{2+}$ can reduce $MnO_4^-$ from the oxidation state +7 to +4 and in the process get oxidized to $Co^{3+}$, providing the proper form of M for the metallomanganese oxide ion-exchanger. Similarly, $Mn^{2+}$ can function in the same manner in a reaction with $MnO_4^-$ to provide $Mn^{3+}$ or $Mn^{4+}$ for the manganese oxide or metallomanganese oxide-based ion-exchanger.

The capacity of an ion-exchanger is one aspect of its effectiveness; the capacity being related, in this case, to how much $Hg^{2+}$ can theoretically be removed from solution by the ion-exchanger. Ion-exchangers with the highest ion-exchange capacities would seem to be the most desirable, because these could remove the most $Hg^{2+}$ from solution. However, the present invention has found that this is not the case for oxide-based ion-exchangers used to remove $Hg^{2+}$ from liquid streams. Here we define the Theoretical Ion-exchange Capacity per framework metal atom, TIC, as follows:

$$TIC = n*w,$$

where "n" is the average valence of the exchangeable cations "A", and "w" is the mole ratio of the exchangeable cations "A" per framework metal (Mn+M) in the metal oxide ion-exchanger. The specification for the manganese oxide and metallomanganese oxide-based ion-exchangers of the present invention requires that the product "n*w" or TIC ranges between 0.08 and 0.25 per framework metal. Essentially, TIC is the charge on the metal framework per metal atom that is balanced by the exchanging cations and thus can be considered to represent the theoretical capacity of the ion-exchangers on a per framework metal basis. In practical applications, ground waters contaminated by $Hg^{2+}$ may also contain competing cations such as $Mg^{2+}$ or $Ca^{2+}$, often at much higher levels, so selectivity for $Hg^{2+}$ is important. The present invention has found that when TIC is between 0.08 and 0.25 per framework metal atom, that the manganese oxide and metallomanganese oxide-based ion-exchangers have exceptional ability to remove $Hg^{2+}$ from solution, showing great affinity for $Hg^{2+}$ over competing $Mg^{2+}$ and $Ca^{2+}$. As the examples will show, when the TIC>0.3, that the manganese oxide-based ion-exchangers begin showing strong affinity for $Ca^{2+}$ and $Mg^{2+}$, while the affinity for $Hg^{2+}$ is reduced.

A preferred method of synthesis of the manganese oxide and metallomanganese oxide-based ion-exchangers of the present invention involves the reduction of permanganate, $MnO_4^-$, with excess acetic acid. This approach was demonstrated earlier in U.S. Pat. No. 5,637,545, in which $K^+$- and $NH_4^+$-containing manganese oxides and metallomanganese oxides having the 2×2 tunnel hollandite structure were synthesized. Acetic acid serves several roles in this synthesis. It serves as a reductant, but not a stoichiometric reductant, an excess can be used. Under the mild conditions employed in U.S. Pat. No. 5,637,545, the reduction process stops at manganese oxide compositions in the region of 0.1 to 0.2 $K^+$/Mn, which is in the middle of the 0.08 to 0.25 range for the favorable TIC value for the charge per framework metal that is balanced by exchanging cations for $Hg^{2+}$ selective ion-exchangers. Not to be bound by theory, but acetic acid not only serves as a reducing agent that takes Mn to the proper oxidation state for this application, but it can also serve as a complexing agent for the $M^{3+}$ metals that may be incorporated into the manganese oxide framework to make the metallomanganese oxides. The incorporation of the $M^{3+}$ metals to the framework can be used to tune the TIC values, since each new $[M^{3+}O_{6/3}]^-$ unit will be accompanied by additional "A" cations. While this synthesis method using permanganate and acetic acid is preferred, the oxidation states of Mn yielding appropriate TIC values can also be achieved by using standard stoichiometric reducing agents such as $NaHCO_2$ or oxidizing agents such as $(NH_4)_2S_2O_8$ to achieve a targeted Mn oxidation state.

The cation form of the manganese oxide and metallomanganese oxide-based ion-exchangers is important both in the synthesis and the performance of the ion-exchanger. In U.S. Pat. No. 5,637,545, the syntheses take place in the presence of $K^+$ and $NH_4^+$, yielding the 2×2 tunnel hollandite structure. In contrast to this, in the present work, the reduction of $NaMnO_4$ in the presence of acetic acid yields an amorphous material, there is no preference to form a particular crystal structure with the $Na^+$. The structure direction role of $K^+$ and $NH_4^+$ in the synthesis of the crystalline hollandite structure, suggests to some degree a favorable interaction between these cations and the metal oxide framework that forms. Since $Na^+$ does not exhibit this behavior when $NaMnO_4$ is used in the synthesis, it can be used with other cations to see what structures they will make. When $Mg^{2+}$, $Li^+$, $Ca^{2+}$ are added to the $NaMnO_4$/acetic acid reaction, the products remain amorphous. However, if a $K^+$ source or $NH_4^+$ source is added to the $NaMnO_4$/acetic acid reaction, the 2×2 tunnel hollandite structure forms again. The small one dimensional tunnel structure of hollandite can lead to diffusional traffic problems during the ion-exchange process. The exchange process for the uptake of $Hg^{2+}$ is observed to be easier in the amorphous materials containing $Na^+$, $Mg^{2+}$, $Li^+$, and $Ca^{2+}$, which don't have a specific enough interaction with the metal oxide framework to promote the formation of crystalline species. In situations with constrained diffusion characteristics, such as the one dimensional 2×2 tunnel of the hollandite structure, the $Na^+$, $Mg^{2+}$, $Ca^{2+}$, and $Li^+$ cations may fare better because they are smaller. It is also shown that $NH_4^+$ is better at being released from the manganese oxide-based ion-exchangers of the hollandite structure than $K^+$ during the exchange process. Finally, the use of the $Mg^{2+}$ and $Ca^{2+}$ forms of the manganese oxide and metallomanganese oxide-based ion-exchangers synthesized by this method are useful in environments where there is substantial competing $Mg^{2+}$ or $Ca^{2+}$ in the solution to be remediated. Such materials are essentially pre-loaded with $Mg^{2+}$ or $Ca^{2+}$, which discourages further uptake of these species, but it is shown in the examples that these materials will perform well in $Hg^{2+}$ uptake only if they meet the charge per framework metal criterion with TIC in the range of 0.08 to 0.25.

For the $Hg^{2+}$ removal application at hand, it may be necessary to form the manganese oxide or metallomanganese oxide-based ion-exchangers into larger particles of sufficient strength for the process via combination with a binder. In U.S. Pat. No. 6,190,562, which is incorporated by reference, there are binding techniques described for the binding of manganese phosphates which are also applicable to the manganese oxide and metallomanganese oxide-based ion-exchangers described here. It is, of course, necessary that the binder material is not soluble to any significant degree in the liquid feed stream to be treated. Binder materials found to satisfy the substantial insolubility requirement and exhibit utility in preparing the bound manganese oxide and metallomanganese oxide-based ion-exchangers adsorbents of the present invention are the inorganic metal oxides selected from the group consisting of silica, titania, zirconia, and mixtures thereof. Silica is most preferred in practice because of its ready availability and low cost.

If it is determined that shaped agglomerates of the manganese oxide or metallomanganese oxide-based ion-exchangers and binder material are to be formed, an extrusion procedure is commonly incorporated. In the first step, a starting solution of the metal, which will ultimately become the metal oxide binder after the proper drying and firing (calcining) steps are employed, is prepared. In the case where titania or zirconia binders are used, for example, the preferred starting solutions are titanium isopropoxide or zirconium acetate, respectively. Types of silica sols used to form the silica binder are commercially available as aquasols or organosols containing dispersed colloidal silica particles. To cause the necessary formation a gel from the starting solution, the addition of a base such as aqueous sodium hydroxide may or may not be required. Once formed, the gel is then blended with the manganese oxide or metallomanganese oxide-based ion-exchanger powder in the proper ratio, according to the desired binder content in the final adsorbent. The resulting mixture is mulled, together with water and a lubricant (or extruding agent) such as glycerin to form a dough, which can then be extruded into particles most commonly having a circular cross section. It is certainly possible to form other cross sectional shapes. Typically, pellet, pill, or extrudate forms are used.

Typically, the initial forming stage in the production of bound pellets, pills, extrudates or other shapes yields "green" particles which possess sufficient strength for a subsequent calcination step to set the binder and activate the manganese oxide and metallomanganese oxide-based ion-exchangers. The temperatures appropriate for this calcination or firing step range from about 250° C. to about 500° C., preferably from about 300° C. to about 400° C. The binder is usually present in an amount of less than about 40% by weight of the binder and manganese oxide-based ion-exchanger combined.

The resulting manganese oxide and metallomanganese oxide-based ion-exchangers are capable of selective ion exchange of $Hg^{2+}$ ions from liquid streams, such as aqueous streams, thereby removing these metals from the liquid streams. The $Hg^{2+}$ ions can be removed from the liquid stream by contacting the stream with the manganese oxide and metallomanganese oxide-based ion-exchangers for a time sufficient to remove the metal ions and trap them. The contacting can be carried out either in a batch mode or in a continuous mode. In a batch mode, the desired ion-exchanger is placed in an appropriate container and the stream to be treated and mixed therewith. Contacting is carried out for a time of about 0.1 to about 100 hr. In a continuous mode, the manganese oxide or metallomanganese oxide-based ion-exchangers are placed in a column and the stream to be treated is flowed through it, usually downflow, until the contaminant metal is detected in the effluent of the column.

The x-ray patterns presented in the following examples were obtained using standard x-ray powder diffraction techniques. The radiation source was a high-intensity x-ray tube operated at 45 kV and 35 mA. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of $100 \times I/I_o$, the above designations are defined as:

$w=0-15; m=15-60; s=60-80$ and $vs=80-100$

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the instant invention, the following examples are set forth. It is to be understood that the examples are only by way of illustration and are not intended as an undue limitation on the broad scope of the invention as set forth in the appended claims.

EXAMPLES

Comparative Example 1

Preparation of $Na^+$-Birnessite $Na^+$-birnessite was prepared via the oxidation of $Mn^{2+}$ in strong base with bubbling $O_2$ gas, adapted from the method of Golden et. al. (See CLAYS AND CLAY MINERALS, 34, 511 (1986)). In a large Teflon vessel, 220 g NaOH (99%) was dissolved in 1000 ml de-ionized water. Oxygen gas was bubbled through the solution with a glass frit for an hour with vigorous stirring. Separately, 67.61 g $MnSO_4*H_2O$ was dissolved in 800 g de-ionized water. This solution was added to the stirring NaOH solution while the flow of $O_2$ continued. The reaction mixture was allowed to stir overnight with continuous bubbling of $O_2$. The dark brown solid was isolated by filtration and washed with de-ionized water. The solid was filtered on a Buchner funnel and stored in a bottle while slightly damp. The product was identified as the layered manganese oxide Na-birnessite via powder x-ray diffraction. The pattern is given in Table 1 below. Elemental analysis showed the Na/Mn ratio to be 0.32. This is the TIC value, the theoretical ion-exchange capacity per framework metal atom.

TABLE 1

| 2-Θ | d(Å) | $I/I_0$ % |
|---|---|---|
| 12.44 | 7.11 | vs |
| 24.98 | 3.56 | m |
| 35.64 | 2.52 | w |
| 37.04 | 2.43 | w |
| 42.04 | 2.15 | w |

Comparative Example 2

$NH_4^+$-birnessite was prepared by the method used in Example 1, except using ammonium hydroxide instead of sodium hydroxide. A Teflon vessel was charged with 1200 g $NH_4OH$ (29% $NH_3$). With vigorous stirring, oxygen gas was bubbled through the solution for an hour using a glass frit. Separately, 60 g $MnSO_4*H_2O$ was dissolved in 400 g de-ionized water. This solution was then added to the ammonium hydroxide solution with vigorous stirring, while the bubbling of $O_2$ was continued. The reaction mixture was stirred overnight while treatment with O₂ gas continued. The dark brown product was isolated by filtration, washed with de-ionized water and dried on a Buchner funnel. The brown solid was stored in a sealed bottle when it was slightly damp. The product was identified as the layered manganese oxide $NH_4^+$-birnessite by powder x-ray diffraction. The diffraction lines are shown in Table 2 below.

TABLE 2

| 2-Θ | d(Å) | I/I₀ % |
|---|---|---|
| 12.48 | 7.09 | vs |
| 24.70 | 3.6 | m |
| 36.66 | 2.45 | m |

Comparative Example 3

A portion of the product from Example 1 was ion-exchanged with 0.5 M Mg(NO₃)₂ solution at room temperature. The product was isolated by filtration, washed with de-ionized water and partially dried on the Buchner funnel. The material was stored in a sealed bottle while still slightly damp. Elemental analysis showed the Mg/Mn ratio to be 0.22, which corresponds to a TIC value of 0.44.

Comparative Example 4

A 53.25 g portion of the product from Example 3 was placed in a solution containing 25.6 g Mg(NO₃)₂*6H₂O dissolved in 100 g de-ionized water. The reaction mixture was homogenized and a portion was placed in a Teflon-lined autoclave and digested at 150° C. for 59 hours. The product was isolated by filtration, washed with de-ionized water and dried at room temperature. The product was identified as Mg—Mn—O todorokite, the 3×3 tunnel compound, by powder x-ray diffraction. A manganite impurity was also present in the product. The diffraction lines are shown in Table 3 below. Elemental analysis showed the Mg/Mn ratio to be 0.27, corresponding to a TIC value of 0.54.

TABLE 3

| 2-Θ | d(Å) | I/I₀ % |
|---|---|---|
| 9.30 | 9.50 | m |
| 18.68 | 4.75 | vs |
| 26.26 | 3.39 | m |
| 36.10 | 2.49 | m |
| 37.12 | 2.42 | m |

Example 5

Ammonium hydroxide, (29% NH₃, 35 g) was diluted with 120 g de-ionized water. The solution pH was 11.6 and this was adjusted to 7.63 by dropwise addition of concentrated HNO₃ and NH₄OH. The pH adjusted solution weighed 168 g. A 50 g portion of the $NH_4^+$-bimessite from Example 2 was added to this solution and the reaction mixture was homogenized for 10 minutes with a high speed stirrer. The brown homogenous reaction mixture was distributed among many Teflon-lined autoclaves and digested at a variety of temperatures at autogenous pressures. The portion digested at 95° C. for 175 hours yielded a product that was isolated by filtration, washed with de-ionized water, and dried at room temperature. The product was identified as the $NH_4^+$—Mn—O phase with the hollandite structure by powder x-ray diffraction. The diffraction lines for the product are shown in Table 4. This 2×2 tunnel structure has the approximate formulation $NH_4Mn_8O_{16}$.

TABLE 4

| 2-Θ | d(Å) | I/I₀ % |
|---|---|---|
| 12.50 | 7.07 | vs |
| 17.84 | 4.97 | m |
| 25.17 | 3.54 | w |
| 28.28 | 3.15 | m |
| 37.34 | 2.41 | vs |
| 41.72 | 2.16 | m |
| 49.57 | 1.84 | m |

Example 6

Ex. 2 from U.S. Pat. No. 5,637,545

10.00 g Ba(MnO₄)₂ was dissolved in 70.0 g distilled water. A second solution was prepared by dissolving 5.28 g (NH₄)₂SO₄ in 58.3 g distilled water and added to the first solution to precipitate BaSO₄. An additional 50.0 g distilled water was added and the reaction mixture was stirred vigorously. The purple solution was then filtered from the white BaSO₄ precipitate, placed in a round-bottom flask and 9.60 g of glacial acetic acid added to the purple solution. The flask was fitted with a reflux condenser and the solution refluxed for 17 hours. The product was a fluffy brown solid, which was isolated from a colorless mother liquor by filtration, washed thoroughly with distilled water, and dried at room temperature. Characterization by powder x-ray diffraction showed the product had the hollandite structure. SEM data showed the product to consist of uniform fiber-like crystals of sub-micron diameters and lengths up to 30 microns, while EDAX data indicated Mn to be the only metal present, implying the product is the $NH_4^+$-containing hollandite manganese oxide, $(NH_4)_{1.05}Mn_8O_{16}$. This yields a TIC value for this material of 0.131; N/Mn=0.131. Representative diffraction lines are shown in Table 5 below.

TABLE 5

| 2Θ | d(Å) | I/I₀ % |
|---|---|---|
| 12.65 | 7.00 | vs |
| 17.97 | 4.94 | m |
| 28.61 | 3.12 | m |
| 37.53 | 2.40 | m |
| 41.87 | 2.16 | m |
| 49.66 | 1.84 | m |

Example 7

A 10.00 g portion of NaMnO₄*H₂O was placed in a beaker and dissolved in 114.81 g de-ionized water with stirring. To the stirring reaction mixture, 10.32 g NaOAc (99%) was added. After a few minutes stirring, 11.33 g glacial HOAc was added. The mixture was stirred further and transferred to a 250 ml round bottom flask. The flask was fitted with a condenser and heated at reflux with stirring for 26 hours. The products were isolated by filtration, washed with de-ionized water, and dried at room temperature. The Na—Mn—O product exhibited very broad, very low intensity features when characterized by powder x-ray diffraction, making it essentially amorphous.

Comparative Example 8

A solution was prepared by dissolving 8.31 g KOH (85%) in 113.37 g de-ionized water, followed by the addition of 18.88 g glacial HOAc. With stirring, 10.00 g $NaMnO_4*H_2O$ was added and allowed to dissolve. The solution was transferred to a 250 ml round bottom flask and an additional 14.41 g de-ionized water was added to aid the transfer. The flask was fitted with a condenser and the reaction mixture heated to reflux for 23 hours. The dark brown solid product was isolated by filtration, washed with de-ionized water and dried at room temperature. The K—Na—Mn—O product was identified as having the 2×2 tunnel hollandite structure by powder x-ray diffraction. The diffraction lines for the product are included in Table 6 below.

TABLE 6

| 2-Θ | d(Å) | $I/I_0$ % |
|---|---|---|
| 12.42 | 7.12 | m |
| 12.60 | 7.02 | m |
| 17.94 | 4.94 | m |
| 25.40 | 3.50 | w |
| 28.74 | 3.10 | m |
| 37.44 | 2.40 | vs |
| 41.80 | 2.16 | m |
| 49.62 | 1.84 | w |

Example 9

A solution was prepared by dissolving 10.00 g $NaMnO_4*H_2O$ in 90.11 g de-ionized water. With stirring, 5.11 g $NH_4NO_3$ was added and dissolved. Then 11.26 g glacial HOAc was added. The reaction mixture was homogenized and then transferred to a 250 ml round bottom flask fitted with a heating mantle and a condenser. The reaction mixture was refluxed for 26 hours. The dark brown product was isolated by filtration, washed with de-ionized water and dried at room temperature. The $Na^+$—$NH_4^+$—Mn—O product was identified as having the 2×2 tunnel hollandite structure by x-ray diffraction. The diffraction lines for the product are given in Table 7 below.

TABLE 7

| 2-Θ | d(Å) | $I/I_0$ % |
|---|---|---|
| 12.56 | 7.04 | vs |
| 17.92 | 4.95 | m |
| 25.25 | 3.52 | w |
| 28.42 | 3.14 | m |
| 37.42 | 2.40 | vs |
| 40.50 | 2.23 | w |
| 41.72 | 2.16 | w |
| 46.62 | 1.95 | w |
| 49.48 | 1.84 | m |

Example 10

In a 250 ml round bottom flask, 10.00 g $NaMnO_4*H_2O$ was dissolved in 100 g de-ionized water. With stirring, solid 12.76 g $LiOAc*2H_2O$ was added in several steps. This was followed by the addition of 11.26 g glacial acetic acid. The flask was fitted with a condenser and heated to reflux for 24 hours. The brown product was isolated by filtration, washed with de-ionized water, and dried at room temperature. The Li—Na—Mn—O product was determined by x-ray diffraction to be mostly amorphous with a single small broad peak at d=2.40 Å.

Example 11

A beaker was charged with 10.00 g $NaMnO_4*H_2O$ and 90.1 g de-ionized water and the suspension was stirred to dissolve the solids. Separately, 16.03 g $Mg(NO_3)_2*6H_2O$ was dissolved in 10.00 g de-ionized water. This solution was added to the reaction mixture with stirring. This was followed by the addition of 11.26 g glacial HOAc and further homogenization. The mixture was transferred to a 250 ml round bottom flask fitted with a condenser and heated at reflux with stirring for 24 hours. The reaction mixture was a very thick brown solid which was isolated by filtration, washed with de-ionized water and dried at room temperature. Powder x-ray diffraction showed the Mg—Na—Mn—O product to be mostly amorphous with a single small broad peak at d=2.40 Å.

Example 12

In a beaker, 10.00 g $NaMnO_4*H_2O$ was dissolved in 90.13 g de-ionized water with stirring. To this solution was added 10.03 g $Ca(OAc)_2$ (99.2%) which was dissolved with stirring. Next, 11.38 g glacial HOAc was added and the reaction mixture was homogenized for 10 minutes. The reaction mixture was transferred to a 250 ml round bottom flask and an additional 25.00 g de-ionized water was added to aid the complete transfer of material. The flask was fitted with a condenser and the reaction mixture was heated to reflux, with stirring, for 22 hours. A very light voluminous dark brown solid was isolated by filtration, washed with de-ionized water, and dried at room temperature. Powder x-ray diffraction showed the Ca—Na—Mn—O product to be mostly amorphous with a barely discernable broad peak at d=2.42 Å.

Example 13

In this example, Co is substituted for some Mn in the framework, similar to the substitution chemistry pursued in U.S. Pat. No. 5,637,545. A beaker was charged with 10.00 g $NaMnO_4*H_2O$ and 90.00 g de-ionized water and stirred to make a solution. Then, 10.22 g solid $NH_4NO_3$ was added with continued stirring. This was followed by the addition of 17.15 g glacial HOAc. Separately, 7.84 g $Co(OAc)_2*4 H_2O$ was dissolved in 45.00 g de-ionized water. This solution was added by the dropperfull with stirring to the dark reaction mixture. After homogenization, the reaction mixture was transferred to a 250 ml round bottom flask with 6 g de-ionized water to help complete the transfer. The flask was fitted with a condenser and the reaction mixture heated to reflux for 22 hours. The dark blue-grey product was isolated by filtration, washed with de-ionized water, and dried at room temperature. Powder x-ray diffraction showed the $NH_4^+$—Na—Co—Mn—O product to have the layered bimessite structure. The diffraction lines for the product are given in Table 8 below.

TABLE 8

| 2-Θ | d(Å) | $I/I_0$ % |
|---|---|---|
| 12.66 | 6.99 | vs |
| 25.3 | 3.52 | m |
| 36.82 | 2.44 | m |
| 38.18 | 2.36 | w |

Example 14

Porous metal oxide structures form during synthesis around host "templates" or "structure-directing agents" (SDA) that reside in the pores and balance the charge on that metal oxide framework. There is some selectivity with respect to this relationship that suggests a significant interaction during the synthesis process. The structure that is directed depends on the composition of the framework, especially the charge on the framework. In these manganese oxide systems, the framework charge is determined by the oxidation state of Mn, which is controlled via reduction of permanganate in the presence of excess acetic acid under mild conditions. We have seen in the examples above that $K^+$ and $NH_4^+$ SDAs form the hollandite structure, the 2×2 tunnel structure for the reaction conditions employed. In contrast, $Li^+$, $Na^+$, $Ca^{2+}$, and $Mg^{2+}$ tend not to direct the formation of a crystalline structure, but form amorphous materials instead. In this example, $Hg^{2+}$ is employed as the SDA to see if a specific structure forms during the synthesis as a result of a strong interaction with $Hg^{2+}$ with manganese oxide framework formed under these synthesis conditions. The result could be a structure that may ultimately prove very selective for $Hg^{2+}$ in ion-exchange applications.

A round bottom flask was charged with 19.93 g $Hg(OAc)_2$ and 100.0 g de-ionized water, which was stirred to form a solution. To this solution, 10.00 g $NaMnO_4 \cdot H_2O$ was added with stirring. After homogenization, 11.26 g glacial HOAc was added. The contents of the flask were washed into the reaction mixture with an additional 5 g of de-ionized water. The flask was fitted with a condenser and the reaction mixture heated to reflux, with stirring, for 24 hours. The product was isolated by filtration, washed with de-ionized water, and dried at room temperature. The fine black-brown Hg—Na—Mn—O solid was determined to be amorphous by powder x-ray diffraction. The $Hg^{2+}$ did not direct any particular structure under these reaction conditions, but yielded an amorphous product, similar to that seen for $Na^+$, $Li^+$, $Mg^{2+}$, and $Ca^{2+}$.

Example 15

$Hg^{2+}$, $Ca^{2+}$ and $Mg^{2+}$ Removal from Solution

The samples from of Examples 1-13 were tested to determine their ability to adsorb $Hg^{2+}$, $Mg^{2+}$ and $Ca^{2+}$ by determining the distributions ($K_d$) for each of the metals between adsorption on the solid vs. remaining in the solution state. The typical $Hg^{2+}$ test solution was prepared by dissolving 44.4 mg of mercuric acetate in 999.54 g tap water inside a 1000 ml polypropylene bottle. This solution contained about 27 ppm $Hg^{2+}$, 31 ppm $Ca^{2+}$ and 10 ppm $Mg^{2+}$, other test solutions contained comparable amounts of the cations in the ranges of 27-30 ppm $Hg^{2+}$, 30–34 ppm $Ca^{2+}$, and 10-11 ppm $Mg^{2+}$. For the test, 200 mg of ion-exchanger is placed in a 30 ml borosilicate vial to which 20 ml of $Hg^{2+}$-containing test solution is added using a 20 ml syringe. The loaded vial is sealed with a cap and placed in a Bohdan shaker and shaken vigorously for 24 hours at room temperature. Once the ion-exchanger has been contacted with the $Hg^{2+}$ solution for the desired amount of time, the solution/solid suspension is removed from the vial using a syringe. Solids were separated from the solution by pushing the syringe contents through a 0.45 um Nylon filter. The solution were collected in a plastic vial and sent for chemical analysis via ICP or ICP/mass spec. Detection levels for Hg, Ca, and Mg were 10-100 ppb, 80 ppb and 20-80 ppb, respectively. It was assumed that the disappearance of the metals from solution were due to adsorption by the solid.

The $K_d$ value for the distribution was calculated using the following formula:

$$K_d(mL/g) = \frac{(V)(Ac)}{(W)(Sc)} 1$$

where:
V=volume of waste simulant (mL)
Ac=concentration of cation absorbed on ion-exchanger (g/mL)
W=mass of ion-exchanger evaluated (g)
Sc=concentration of cation in post reaction supernate (g/mL)

Table 9 below summarizes the results of the uptake studies.

TABLE 9

Distributions expressed as $K_d$ values (ml/g) for uptake of $Hg^{2+}$, $Ca^{2+}$ and $Mg^{2+}$

| Example | Composition | Structure | Hg $K_d$ | Ca $K_d$ | Mg $K_d$ |
|---|---|---|---|---|---|
| C1 | $Na^+$—Mn—O | birnessite | 1430 | 12700 | >10400 |
| C2 | $NH_4^+$—Mn—O | birnessite | 24900 | 10600 | >10400 |
| C3 | $Mg^{2+}$—Mn—O | birnessite | 1280 | 104 | −53 |
| C4 | $Mg^{2+}$—Mn—O | todorokite | 2400 | 42 | −42 |
| 5 | $NH_4^+$—Mn—O | hollandite | 53800 | 751 | 136 |
| 6 | $NH_4^+$—Mn—O | hollandite | 36100 | 40 | −5 |
| 7 | $Na^+$—Mn—O | amorphous | 98200 | 1400 | 640 |
| C8 | $K^+$—$Na^+$—Mn—O | hollandite | 15800 | 93 | 14 |
| 9 | $NH_4^+$—$Na^+$—Mn—O | hollandite | 70100 | 79 | 9 |
| 10 | $Li^+$—$Na^+$—Mn—O | amorphous | 155000 | 1950 | 315 |
| 11 | $Mg^{2+}$—$Na^+$—Mn—O | amorphous | 134000 | 888 | −1 |
| 12 | $Ca^{2+}$—$Na^+$—Mn—O | amorphous | 32700 | 85 | 337 |
| 13 | $NH_4^+$—$Na^+$—$Co^{3+}$—Mn—O | birnessite | 81800 | 7456 | 2150 |

C indicates Comparative Example, e.g., C1 = Comparative Example 1

In Comparative Examples 1 and 2, $Na^+$- and $NH_4^+$-birnessites, layered manganese oxides prepared via oxidation of $Mn^{2+}$ with $O_2$ in hydroxide media, have theoretical ion-exchange capacities per framework metal atom, TIC, greater than 0.3(Na-birnessite analyzed to be $Na^+$/Mn=0.32). These two materials showed high affinity for $Mg^{2+}$ and $Ca^{2+}$, taking the $Mg^{2+}$ below detectable levels of the analysis. The $NH_4^+$-birnessite of Example 2, showed better affinity for $Hg^{2+}$ than the $Na^+$-birnessite of Example 1, but in each case there was no real selectivity for $Hg^{2+}$ over $Mg^{2+}$ and $Ca^{2+}$. Comparative Example 3 is $Mg^{2+}$-birnessite produced via $Mg^{2+}$ ion-exchange of Na-bimessite. The test shows that having the $Mg^{2+}$ form inhibits the uptake of $Ca^{2+}$ and $Mg^{2+}$, but the uptake of $Hg^{2+}$ is still poor since TIC>0.3. In Comparative Example 4, this $Mg^{2+}$ bimessite is hydrothermally transformed to form the 3×3 todorokite structure with a composition Mg/Mn=0.27, which corresponds to a TIC=0.54. Since this material is in the $Mg^{2+}$ form, it does not take up $Ca^{2+}$ or $Mg^{2+}$, but still shows poor uptake for $Hg^{2+}$.

Examples 5 and 6 are $NH_4Mn_8O_{16}$ with the 2×2 tunnel hollandite structure prepared via hydrothermal transformation of $NH_4$ bimessite and from $NH_4MnO_4$/HOAc solution (Ex. 2, U.S. Pat. No. 5,637,545), respectively. As seen repeatedly in U.S. Pat. No. 5,637,545, the TIC for manganese oxides with the hollandite structure is around 0.15 and that for Example 6 was determined to be 0.131. As shown in Table 9, these two samples are much more selective for $Hg^{2+}$ uptake than the $NH_4^+$-bimessite of Comparative Example 2 as $Hg^{2+}$ uptake is enhanced while the uptake of $Mg^{2+}$ and $Ca^{2+}$ uptake is greatly decreased.

Examples 7-12 are materials derived from syntheses employing $NaMnO_4$, acetic acid, and usually another cation. These materials are assumed to have the same TIC as the Mn hollandites of U.S. Pat. No. 5,637,545 since they are also derived from the reduction of permanganate with excess acetic acid. This is supported by the fact that when $K^+$ (Comparative Example 8) and $NH_4^+$ (Example 9) cations are added to the reaction mixture, the hollandite structure forms. The TIC value is about 0.15 for these materials.

In Example 7, the reaction with just $NaMnO_4$, acetic acid and NaOAc gives an amorphous material. As mentioned above, when $K^+$ (Ex. C8) and $NH_4^+$ (Ex. 9) are the cations added to the reaction, the hollandite structure results. The structure of the metal oxide is not an important factor in performance since Table 9 shows that all three of these materials are selective for $Hg^{2+}$ over $Mg^{2+}$ and $Ca^{2+}$. The Ex. 7 amorphous sodium manganese oxide performed the best in the uptake of $Hg^{2+}$ ($K_d$=98200). This is perhaps because $Na^+$ has a weaker interaction with the metal oxide framework and is more easily displaced by $Hg^{2+}$. Support for this comes from the $NH_4^+$-derived hollandite of Example 9, which is actually a $Na^+$—$NH_4^+$-hollandite that performs better in $Hg^{2+}$ uptake ($K_d$=70100) than its pure $NH_4^+$ analogs from Examples 5 ($K_d$=53800) and 6 ($K_d$=36100). The K-derived hollandite of Ex. C8 performed the worst in $Hg^{2+}$ uptake with a $K_d$ of 15800. Its strong specificity for the hollandite structure and large size (ionic radius=1.38 Å) make its displacement from the one-dimensional tunnel of the hollandite structure more problematic in the ion-exchange process.

In Examples 10, 11 and 12, the cations $Li^+$, $Mg^{2+}$ and $Ca^{2+}$, respectively are added to the $NaMnO_4$/HOAc reaction mixture and, like $Na^+$ case, form amorphous materials. In Table 9, it can be seen that all three of these materials are selective for $Hg^{2+}$ over $Mg^{2+}$ and $Ca^{2+}$. The materials prepared in the $Li^+$—$Na^+$ (Ex. 10) and the $Mg^{2+}$—$Na^+$ (Ex. 11) systems performed exceptionally well in $Hg^{2+}$ uptake ($K_d$=155000 in Ex. 10; 134000 in Ex. 11), better than the $Na^+$ only system of Ex. 7. The $Mg^{2+}$ system of Ex. 11 showed the additional advantage of no detectable net uptake of $Mg^{2+}$. The $Ca^{2+}$—$Na^+$ derived manganese oxide ion-exchanger (Ex. 12) did not perform as well as the $Na^+$-only material of Ex. 9 in $Hg^{2+}$ uptake, but did a better job in suppressing the uptake of $Mg^{2+}$ and $Ca^{2+}$.

Example 13 demonstrates a metallomanganese ion-exchange composition in which $Co^{3+}$ is incorporated into the manganese oxide via oxidation of $Co^{2+}$ by permanganate. This perturbation to the manganese oxide framework increases the theoretical ion-exchange capacity, the TIC value, by the addition of $[Co^{3+}O_{6/3}]^-$ to the framework. The reaction is similar to that of Ex. 9, where in the manganese only system the combination of $Na^+$ and $NH_4^+$ lead to the 2×2 tunnel hollandite structure. The additional $Co^{3+}$, however, shifts the system away from forming the hollandite structure and the layered bimessite structure forms. The bimessite structure is usually has higher TIC values than the hollandite structure as seen for the bimessites prepared in Examples 1 and 2. Comparing performance in $Hg^{2+}$ uptake, the materials prepared in Examples 9 and 13 are comparable with $Hg^{2+}$ $K_d$ s of 70,100 and 81,800, respectively (Table 9). However, the inclusion of $Co^{3+}$ and the resulting increase in TIC makes the metallomanganese ion-exchanger better at taking up $Mg^{2+}$ and $Ca^{2+}$ than the manganese-only system of Example 9, decreasing the $Hg^{2+}$ selectivity. When compared to the $Na^+$ and $NH_4^+$ manganese only birnessites of Examples 1 and 2, the $Na^+$—$NH_4^+$—$Co^{3+}$-manganese oxide of Example 13 is much still more effective for $Hg^{2+}$ uptake and does not take up $Mg^{2+}$ and $Ca^{2+}$ nearly as well. Since all three of these materials have the bimessite structure, we are able to decouple the effects of structure from the TIC, and we see that having the appropriate TIC is important for selectivity. Hence, it is possible to tune the performance of the ion-exchange by controlling the theoretical ion-exchange capacity per metal framework atom, the TIC, via substitution with $M^{3+}$ to the manganese oxide framework. Such metallomanganese oxide-based ion-exchangers may be further tuned for performance by changing the "A" cations in the synthesis, as shown in the other examples above for the manganese only ion-exchangers.

The invention claimed is:

1. A process for removing an $Hg^{2+}$ contaminant from a liquid stream comprising contacting the liquid stream with a manganese-oxide-based ion-exchanger or a metallomanganese oxide-based ion-exchanger for a time sufficient to adsorb the $Hg^{2+}$ contaminant onto the ion-exchanger, wherein an as-synthesized manganese oxide-based ion-exchanger and an as-synthesized metallomanganese oxide-based ion-exchanger may be described by the general formulation on an anhydrous basis

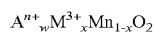

$$A^{n+}{}_w M^{3+}{}_x Mn_{1-x} O_2$$

where "A" is at least one exchangeable cation selected from the group of $H^+$, $Na^+$, $Li^+$, $NH_4^+$, $Mg^{2+}$ and $Ca^{2+}$, "n" is the weighted average valence of the "A" cations and ranges from 1 to 2, "w" is the mole ratio of "A" to framework metals (Mn+M) and varies from 0.04 to 0.25, "n*w" is the framework charge balanced by the "A" cations per framework metal and varies from 0.08 to 0.25, "M" is at least one metal of +3 valence selected from the group Al, Fe, Co, Cr, and Ga, "x" is the mole fraction of M that substitutes for Mn and varies from 0 to 0.20.

2. The process of claim 1 wherein said manganese-oxide-based ion-exchanger and said metallomanganese oxide-based ion-exchanger do not conform to any particular crystal structure.

3. The process of claim 1 where the metal ion contaminant is $Hg^{2+}$ is removed from a liquid stream also containing $Mg^{2+}$ and $Ca^{2+}$.

4. The process of claim 1 where the ion-exchanger has a hollandite structure.

5. The process of claim 1 where the ion-exchanger has a birnessite structure.

6. The process of claim 1 where the ion-exchanger has a todorokite structure.

7. The process of claim 1 where the ion-exchanger is amorphous.

8. The process of claim 1 where the ion-exchanger comprises a mixture of ion exchangers having two or more different exchangeable cations.

9. The process of claim 1 and the ion-exchanger is a metallomanganese oxide and M=Fe, Al, Co, and mixtures thereof.

10. The process of claim 1 where the ion-exchanger is a metallomanganese oxide and x is greater than 0 but less than or equal to 0.1.

11. The process of claim 1 where the ion-exchanger is a metallomanganese oxide and x is greater than 0 but less than or equal to 0.05.

12. The process of claim 1 in which the ion-exchanger has a theoretical ion-exchange capacity per framework metal atom, of n*w, greater than 0.1 and less than 0.2.

13. The process of claim 1 where the process is a batch process.

14. The process of claim 1 where the process is a continuous process.

15. The process of claim 1 where the contacting time is from about 0.1 to about 100 hour.

16. The process of claim 1 where the liquid stream is an aqueous stream.

\* \* \* \* \*